(12) United States Patent
Jin

(10) Patent No.: US 12,676,356 B2
(45) Date of Patent: Jul. 7, 2026

(54) VEHICLE CONTROL APPARATUS AND METHOD FOR CONTROLLING BATTERY TEMPERATURE OR OUTPUT BASED ON STATES OF HEALTH

(71) Applicants: Hyundai Motor Company, Seoul (KR); Kia Corporation, Seoul (KR)

(72) Inventor: Soo Yang Jin, Whasung-Si (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 80 days.

(21) Appl. No.: 18/740,893

(22) Filed: Jun. 12, 2024

(65) Prior Publication Data

US 2025/0201959 A1 Jun. 19, 2025

(30) Foreign Application Priority Data

Dec. 18, 2023 (KR) ........................ 10-2023-0184900

(51) Int. Cl.
| | |
|---|---|
| *H01M 10/633* | (2014.01) |
| *B60L 58/16* | (2019.01) |
| *B60L 58/25* | (2019.01) |
| *B60L 58/26* | (2019.01) |
| *B60L 58/27* | (2019.01) |

(Continued)

(52) U.S. Cl.
CPC ........... *H01M 10/633* (2015.04); *B60L 58/25* (2019.02); *H01M 10/425* (2013.01); *H01M 10/48* (2013.01); *H01M 10/486* (2013.01); *H01M 10/613* (2015.04); *H01M 10/625* (2015.04); *B60L 58/16* (2019.02); *B60L 58/26* (2019.02);

(Continued)

(58) Field of Classification Search
CPC .. H01M 10/425; H01M 10/48; H01M 10/486; H01M 10/613; H01M 10/625
See application file for complete search history.

(56) References Cited

U.S. PATENT DOCUMENTS

| | | |
|---|---|---|
| 10,017,069 B2 | 7/2018 | Lim et al. |
| 2018/0050601 A1 | 2/2018 | Katanoda |

(Continued)

FOREIGN PATENT DOCUMENTS

| | | |
|---|---|---|
| CN | 113255205 A | 8/2021 |
| CN | 116080477 A | 5/2023 |

(Continued)

*Primary Examiner* — Scott A Browne
*Assistant Examiner* — Josephine Elizabeth Rich
(74) *Attorney, Agent, or Firm* — MORGAN, LEWIS & BOCKIUS LLP

(57) ABSTRACT

A vehicle control apparatus and a method thereof are provided. The vehicle control apparatus includes a memory storing a program instruction and a processor that executes the program instruction. The processor obtains reference states of health (SOHs) for each vehicle type, which are determined through evaluation of durability of batteries for each vehicle type, identifies which vehicle type of battery a battery of a host vehicle corresponds to, identifies a reference SOH of the host vehicle, which is corresponds to the battery of the host vehicle, among the reference SOHs for each vehicle type, and controls at least one of a temperature of the battery or an output of the battery, or any combination thereof, based on that it is identified that an SOH of the battery of the host vehicle is smaller than the reference SOH of the host vehicle.

18 Claims, 6 Drawing Sheets

(51) Int. Cl.
  *H01M 10/42*          (2006.01)
  *H01M 10/48*          (2006.01)
  *H01M 10/613*         (2014.01)
  *H01M 10/625*         (2014.01)

(52) U.S. Cl.
  CPC .......... *B60L 58/27* (2019.02); *H01M 2220/20*
                                    (2013.01)

(56)                References Cited

U.S. PATENT DOCUMENTS

2022/0105793 A1\*  4/2022  Sukhatankar ......... B60W 30/19
2023/0094070 A1\*  3/2023  Duan .................. H01M 10/613
                                    701/22

FOREIGN PATENT DOCUMENTS

JP        2007-323999  A    12/2007
JP        2017-062892  A     3/2017
JP        2018-029430  A     2/2018
KR    10-2017-0060499  A     6/2017
KR    10-2021-0156919  A    12/2021
KR    10-2023-0064981  A     5/2023

\* cited by examiner

VEHICLE CONTROL APPARATUS AND METHOD FOR CONTROLLING BATTERY TEMPERATURE OR OUTPUT BASED ON STATES OF HEALTH

CROSS-REFERENCE TO RELATED APPLICATION

The present application claims priority to Korean Patent Application No. 10-2023-0184900, filed on Dec. 18, 2023, the entire contents of which is incorporated herein for all purposes by this reference.

BACKGROUND OF THE PRESENT DISCLOSURE

Field of the Present Disclosure

The present disclosure relates to a vehicle control apparatus and a method thereof, and more particularly, relates to battery management technologies.

Description of Related Art

Recently, as the spread of electric vehicles has become more active, the importance of technology related to batteries of the electric vehicles has emerged. In this regard, many technologies for a state of health (SOH) which refers to a life state of a battery have been developed to efficiently manage the life of the battery.

A technology focused on more accurately predicting the SOH of the vehicle battery has been intensively developed.

In general, the battery of the electric vehicle decreases in SOH over time. Even for the same battery, the degree to the SOH decrease of the battery may vary with a driving environment of the vehicle or a driving characteristic of a driver of the vehicle.

Accordingly, when the degree to which the SOH of the battery of the host vehicle decreases depending on the driving environment of the vehicle or the driving characteristic of the driver is greater than the degree to which the SOH of the battery generally decreases, there is a demand for control for managing the SOH of the battery of the host vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle control apparatus for controlling a temperature of a battery of a host vehicle or an output of the battery to optimize an SOH of the battery of the host vehicle, when the SOH of the battery of the host vehicle is smaller than a reference SOH and a method thereof.

Another aspect of the present disclosure provides a vehicle control apparatus for providing a user with a notification that an SOH of a battery of a host vehicle is smaller than a reference SOH, when the SOH of the battery of the host vehicle is smaller than the reference SOH, to allow the user to select whether to perform control for managing the SOH of the battery of the host vehicle so that the user may manage the SOH of the battery on his or her own, and a method thereof.

Another aspect of the present disclosure provides a vehicle control apparatus for controlling a temperature of a battery of a host vehicle or an output of the battery to optimize the SOH of the battery of the host vehicle so that the user safely utilizes the host vehicle for a long time and a method thereof.

Another aspect of the present disclosure provides a vehicle control apparatus for monitoring whether an SOH of a battery of a host vehicle is smaller than a reference SOH, using SOHs of batteries for each vehicle type, which are obtained through the evaluation of the durability of the batteries for each vehicle type, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle control apparatus may include a memory storing a program instruction and a processor that executes the program instruction. The processor may obtain reference states of health (SOHs) for each vehicle type, the reference SOHs being determined through evaluation of durability of batteries for each vehicle type, may identify which vehicle type of battery a battery of a host vehicle corresponds to, may identify a reference SOH of the host vehicle, the reference SOH corresponding to the battery of the host vehicle, among the reference SOHs for each vehicle type, and may be configured for controlling at least one of a temperature of the battery or an output of the battery, or any combination thereof, based on that the processor identifies that an SOH of the battery of the host vehicle is smaller than the reference SOH of the host vehicle.

In an exemplary embodiment of the present disclosure, the processor is configured for controlling a coolant depending on a first heating condition to increase the temperature of the battery, based on that the processor identifies that a degree to which the SOH of the battery is smaller than the reference SOH of the host vehicle is less than a predetermined difference value and that the processor identifies that the temperature of the battery is less than a first temperature including a low temperature at which performance of the battery deteriorates, in a state in which the host vehicle is traveling, or may be configured for controlling the coolant depending on a second heating condition to increase the temperature of the battery, based on that the processor identifies that the degree to which the SOH of the battery is smaller than the reference SOH of the host vehicle is greater than or equal to the predetermined difference value and that the processor identifies that the temperature of the battery is less than the first temperature, in the state in which the host vehicle is traveling. The first heating condition and the second heating condition may include at least one of a time to heat the coolant, a number of times to heat the coolant, a temperature at which the coolant is heated, a flow rate of the coolant, or a flow velocity of the coolant, or any combination thereof. The number of operations per day in the first heating condition may be set to be smaller than the number of operations per day in the second heating condition.

In an exemplary embodiment of the present disclosure, the processor is configured for controlling a coolant depending on a first cooling condition to decrease the temperature of the battery, based on that the processor identifies that a degree to which the SOH of the battery is smaller than the reference SOH of the host vehicle is less than a predetermined difference value and that the processor identifies that the temperature of the battery is greater than a second temperature including a high temperature at which performance of the battery deteriorates, in a state in which the host vehicle is traveling, or may be configured for controlling the coolant depending on a second cooling condition to decrease the temperature of the battery, based on that the processor identifies that the degree to which the SOH of the battery is smaller than the reference SOH of the host vehicle is greater than or equal to the predetermined difference value and that the processor identifies that the temperature of the battery is greater than the second temperature, in the state in which the host vehicle is traveling. The first cooling condition and the second cooling condition may include at least one of a time to cool the coolant, a number of times to cool the coolant, a temperature at which the coolant is cooled, instant cooling performance, or a time when the coolant is maintained, or any combination thereof.

In an exemplary embodiment of the present disclosure, the instant cooling performance may be determined based on at least one of a degree to which a flow rate of the coolant increases or a degree to which a flow velocity of the coolant increases, or any combination thereof.

In an exemplary embodiment of the present disclosure, the processor is configured for controlling a coolant depending on a third cooling condition to decrease the temperature of the battery, based on that the processor identifies that a degree to which the SOH of the battery is smaller than the reference SOH of the host vehicle is less than a predetermined difference value and that the processor identifies that the temperature of the battery is greater than a second temperature including a high temperature at which performance of the battery deteriorates, in a state in which the host vehicle is not traveling, or may be configured for controlling the coolant depending on a fourth cooling condition to decrease the temperature of the battery, based on that the processor identifies that the degree to which the SOH of the battery is smaller than the reference SOH of the host vehicle is greater than or equal to the predetermined difference value and that the processor identifies that the temperature of the battery is greater than the second temperature, in the state in which the host vehicle is not traveling. The third cooling condition and the fourth cooling condition may include at least one of a time to cool the coolant, a number of times to cool the coolant, a temperature at which the coolant is cooled, instant cooling performance, or a time when the coolant is maintained, or any combination thereof. The number of operations per day in the third cooling condition may be set to be smaller than the number of operations per day in the fourth cooling condition.

In an exemplary embodiment of the present disclosure, the processor may more decrease the output of the battery than an output of the battery when the SOH of the battery of the host vehicle is not smaller than the reference SOH of the host vehicle, depending on a first output condition, in a state in which the host vehicle is traveling, based on that the processor identifies that a degree to which the SOH of the battery is smaller than the reference SOH of the host vehicle is less than a predetermined difference value, or may more decrease the output of the battery than the output of the battery when the SOH of the battery of the host vehicle is not smaller than the reference SOH of the host vehicle, depending on a second output condition, in the state in which the host vehicle is traveling, based on that the processor identifies that the degree to which the SOH of the battery is smaller than the reference SOH of the host vehicle is greater than or equal to the predetermined difference value. The output of the battery while the host vehicle is traveling according to the first output condition may be set to be smaller than the output of the battery while the host vehicle is traveling according to the second output condition or a maximum output of the battery according to the first output condition may be set to be smaller than a maximum output of the battery according to the second output condition.

In an exemplary embodiment of the present disclosure, the reference SOH of the host vehicle may be set by any one of an accumulated driving distance of the host vehicle, a duration of use of the battery, or a life cycle of the battery.

In an exemplary embodiment of the present disclosure, the processor may monitor the SOH of the battery and may compare the SOH of the battery with the reference SOH of the host vehicle.

In an exemplary embodiment of the present disclosure, the processor may provide a user with a notification of selecting or recommending whether to control the at least one of the temperature of the battery or the output of the battery, or the any combination thereof, when the processor identifies that the SOH of the battery is smaller than the reference SOH of the host vehicle.

In an exemplary embodiment of the present disclosure, the processor is configured to determine the SOH of the battery, based on at least one of a charging capacity when the battery is charged, charging energy when the battery is charged, a voltage drop for each output of the battery when the host vehicle is traveling, or discharging energy of the battery, or any combination thereof.

In an exemplary embodiment of the present disclosure, the processor may end the control of the at least one of the temperature of the battery or the output of the battery, or the any combination thereof, based on that the temperature of the battery reaches a temperature at which performance of the battery does not deteriorate or when the SOH of the battery reaches the reference SOH of the host vehicle.

According to another aspect of the present disclosure, a vehicle control method may include obtaining, by a processor, states of health (SOHs) for each vehicle type, the reference SOHs being determined through evaluation of durability of batteries for each vehicle type, identifying, by the processor, which vehicle type of battery a battery of a host vehicle corresponds to, identifying, by the processor, a reference SOH of the host vehicle, the reference SOH corresponding to the battery of the host vehicle, among the reference SOHs for each vehicle type, identifying, by the processor, that an SOH of the battery of the host vehicle is smaller than the reference SOH of the host vehicle, and controlling, by the processor, at least one of a temperature of the battery or an output of the battery, or any combination thereof.

In the vehicle control method according to an exemplary embodiment of the present disclosure, the controlling of the at least one of the temperature of the battery or the output of the battery, or the any combination thereof by the processor may include controlling, by the processor, the at least one of the temperature of the battery or the output of the battery, or the any combination thereof, depending on any one of a first heating condition and a second heating condition including at least one of a time to heat a coolant, a number of times to heat the coolant, a temperature at which the coolant is heated, a flow rate of the coolant, or a flow velocity of the coolant, or any combination thereof. The controlling of the at least one of the temperature of the battery or the output of the battery, or the any combination thereof, depending on the any one of the first heating condition and the second heating condition by the processor may include controlling, by the processor, the coolant depending on the first heating condition to increase the temperature of the battery, based on that it is identified that a degree to which the SOH of the battery is smaller than the reference SOH of the host vehicle is less than a predetermined difference value and that it is identified that the temperature of the battery is less than a first temperature including a low temperature at which performance of the battery deteriorates, in a state in which the host vehicle is traveling, or controlling, by the processor, the coolant depending on the second heating condition to increase the temperature of the battery, based on that it is identified that the degree to which the SOH of the battery is smaller than the reference SOH of the host vehicle is greater than or equal to the predetermined difference value and that it is identified that the temperature of the battery is less than the first temperature, in the state in which host vehicle is traveling. The number of operations per day in the first heating condition may be set to be smaller than the number of operations per day in the second heating condition.

In the vehicle control method according to an exemplary embodiment of the present disclosure, the controlling of the at least one of the temperature of the battery or the output of the battery, or the any combination thereof by the processor may include controlling, by the processor, the at least one of the temperature of the battery or the output of the battery, or the any combination thereof, depending on any one of a first cooling condition and a second cooling condition including at least one of a time to cool a coolant, a number of times to cool the coolant, a temperature at which the coolant is cooled, instant cooling performance, or a time when the coolant is maintained, or any combination thereof. The controlling of the at least one of the temperature of the battery or the output of the battery, or the any combination thereof, depending on the any one of the first cooling condition and the second cooling condition by the processor may include controlling, by the processor, the coolant depending on the first cooling condition to decrease the temperature of the battery, based on that it is identified that a degree to which the SOH of the battery is smaller than the reference SOH of the host vehicle is less than a predetermined difference value and that it is identified that the temperature of the battery is greater than a second temperature including a high temperature at which performance of the battery deteriorates, in a state in which the host vehicle is traveling, or controlling, by the processor, the coolant depending on the second cooling condition to decrease the temperature of the battery, based on that it is identified that the degree to which the SOH of the battery is smaller than the reference SOH of the host vehicle is greater than or equal to the predetermined difference value and that it is identified that the temperature of the battery is greater than the second temperature, in the state in which the host vehicle is traveling.

In the vehicle control method according to an exemplary embodiment of the present disclosure, the controlling of the at least one of the temperature of the battery or the output of the battery, or the any combination thereof by the processor may include determining, by the processor, the instant cooling performance, based on at least one of a degree to which a flow rate of the coolant increases or a degree to which a flow velocity of the coolant increases, or any combination thereof.

In the vehicle control method according to an exemplary embodiment of the present disclosure, the controlling of the at least one of the temperature of the battery or the output of the battery, or the any combination thereof by the processor may include controlling, by the processor, the at least one of the temperature of the battery or the output of the battery, or the any combination thereof, depending on any one of a third cooling condition and a fourth cooling condition including at least one of a time to cool a coolant, a number of times to cool the coolant, a temperature at which the coolant is cooled, instant cooling performance, or a time when the coolant is maintained, or any combination thereof. The controlling of the at least one of the temperature of the battery or the output of the battery, or the any combination thereof, depending on the any one of the third cooling condition and the fourth cooling condition by the processor may include controlling, by the processor, the coolant depending on the third cooling condition to decrease the temperature of the battery, based on that it is identified that a degree to which the SOH of the battery is smaller than the reference SOH of the host vehicle is less than a predetermined difference value and that it is identified that the temperature of the battery is greater than a second temperature including a high temperature at which performance of the battery deteriorates, in a state in which the host vehicle is not traveling, or controlling, by the processor, the coolant depending on the fourth cooling condition to decrease the temperature of the battery, based on that it is identified that the degree to which the SOH of the battery is smaller than the reference SOH of the host vehicle is greater than or equal to the predetermined difference value and that it is identified that the temperature of the battery is greater than the second temperature, in the state in which the host vehicle is not traveling. The number of operations per day in the third cooling condition may be set to be smaller than the number of operations per day in the fourth cooling condition.

In the vehicle control method according to an exemplary embodiment of the present disclosure, the controlling of the at least one of the temperature of the battery or the output of the battery, or the any combination thereof by the processor may include more decreasing, by the processor, the output of the battery than an output of the battery when the SOH of the battery of the host vehicle is not smaller than the reference SOH of the host vehicle, depending on a first output condition, in a state in which the host vehicle is traveling, based on that it is identified that a degree to which the SOH of the battery is smaller than the reference SOH of the host vehicle is less than a predetermined difference value, or more decreasing, by the processor, the output of the battery than the output of the battery when the SOH of the battery of the host vehicle is not smaller than the reference SOH of the host vehicle, depending on a second output condition, in the state in which the host vehicle is traveling, based on that it is identified that the degree to which the SOH of the battery is smaller than the reference SOH of the host vehicle is greater than or equal to the predetermined difference value. The output of the battery while the host vehicle is traveling according to the first output condition may be set to be smaller than the output of the battery while the host vehicle is traveling according to the second output condition or a maximum output of the battery according to the first output condition may be set to be smaller than a maximum output of the battery according to the second output condition.

In the vehicle control method according to an exemplary embodiment of the present disclosure, the identifying of the reference SOH of the host vehicle, the reference SOH corresponding to the battery of the host vehicle, among the reference SOHs for each vehicle type by the processor may include setting, by the processor, the reference SOH of the host vehicle by any one of an accumulated driving distance of the host vehicle, a duration of use of the battery, or a life cycle of the battery.

In the vehicle control method according to an exemplary embodiment of the present disclosure, the identifying of that the SOH of the battery of the host vehicle is smaller than the reference SOH of the host vehicle by the processor may include providing, by the processor, a user with a notification of selecting whether to control the at least one of the temperature of the battery or the output of the battery, or the any combination thereof, when it is identified that the SOH of the battery is smaller than the reference SOH of the host vehicle, or providing, by the processor, the user with a notification of recommending the control of the at least one of the temperature of the battery or the output of the battery, or the any combination thereof, when it is identified that the SOH of the battery is smaller than the reference SOH of the host vehicle.

In the vehicle control method according to an exemplary embodiment of the present disclosure, the identifying of that the SOH of the battery of the host vehicle is smaller than the reference SOH of the host vehicle by the processor may include determining, by the processor, the SOH of the battery, based on at least one of a charging capacity when the battery is charged, charging energy when the battery is charged, a voltage drop for each output of the battery when the host vehicle is traveling, or discharging energy of the battery, or any combination thereof.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
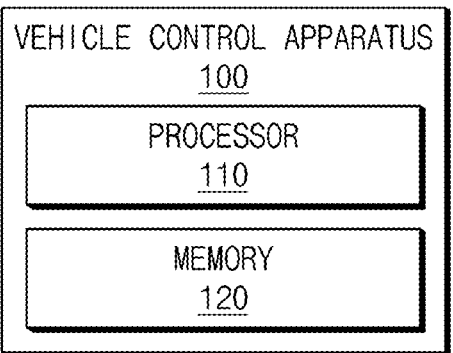
FIG. 1 is a block diagram illustrating a vehicle control apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical component is designated by the identical numerals even when they are displayed on other drawings. Furthermore, a detailed description of well-known features or functions will be ruled out in order not to unnecessarily obscure the gist of the present disclosure.

In describing components of exemplary embodiments of the present disclosure, the terms first, second, A, B, (a), (b), and the like may be used herein. These terms are only used to distinguish one component from another component, but do not limit the corresponding components irrespective of the order or priority of the corresponding components. The expression "at least one of A, B, or C, or any combination thereof" may include "A", "B", or "C", or "AB", "BC", "AC", or "ABC", which is a combination thereof.

Furthermore, unless otherwise defined, all terms including technical and scientific terms used herein have the same meaning as being generally understood by those skilled in the art to which the present disclosure pertains. Such terms as those defined in a generally used dictionary are to be interpreted as including meanings equal to the contextual meanings in the relevant field of art, and are not to be interpreted as including ideal or excessively formal meanings unless clearly defined as including such in the present application.

Hereinafter, various exemplary embodiments of the present disclosure will be described in detail with reference to FIGS. 1 to 6.

FIG. 1 is a block diagram illustrating a vehicle control apparatus according to an exemplary embodiment of the present disclosure.

According to an exemplary embodiment of the present disclosure, a vehicle control apparatus 100 may include a processor 110 and a memory 120. The components of the vehicle control apparatus 100, which are shown in FIG. 1, are merely illustrative, and embodiments of the present disclosure are not limited thereto. For example, the vehicle control apparatus 100 may further include components which are not shown in FIG. 1.

According to an exemplary embodiment of the present disclosure, the memory 120 may store a command or data. For example, the memory 120 may store one instruction or two or more instructions, when executed by the processor 110, causing the vehicle control apparatus 100 to perform various operations.

According to an exemplary embodiment of the present disclosure, the memory 120 may include a non-volatile memory (e.g., a read only memory (ROM)) and a volatile memory (e.g., a random access memory (RAM)).

According to an exemplary embodiment of the present disclosure, the memory 120 and the processor 110 may be implemented as one chipset and may store various pieces of information associated with the vehicle control apparatus 100. For example, the memory 120 may store information related to an operation history of the processor 110. As a detailed example, such information may include a state of health (SOH) for each vehicle type, which are determined through the evaluation of the durability of a battery for each vehicle type, a condition for heating a coolant, a condition for cooling the coolant, or the like in the memory 120.

According to an exemplary embodiment of the present disclosure, the processor 110 may obtain reference SOHs for each vehicle type, which are determined through the evaluation of the durability of the batteries for each vehicle type, may identify which vehicle type of battery a battery of the host vehicle corresponds to, may identify a reference SOH of the host vehicle, which corresponds to the battery of the host vehicle, among the reference SOHs for each vehicle type, and may be configured for controlling at least one of a temperature of the battery or an output of the battery, or any combination thereof, based on that it is identified that an SOH of the battery of the host vehicle is smaller than the reference SOH of the host vehicle.

According to an exemplary embodiment of the present disclosure, the SOH for each vehicle type may be determined through the evaluation of the durability of the batteries for each vehicle type. For example, the SOH for each vehicle type may include a standard SOH established through the evaluation of the durability of a battery system according to the vehicle type.

For example, the SOH for each vehicle type may include information related to an accumulated driving distance of the host vehicle, a duration of use of the battery, or a degree to which the SOH decreases according to a life cycle of the battery. Herein, the life cycle of the battery may be the number of times that the battery is charged to its total capacity, and 1 cycle may mean that the discharged battery is fully charged to 100%.

For example, the SOH for each vehicle type may include information related to a degree to which the SOH of the battery decreases on average depending on the vehicle type.

As a detailed example, the SOH for each vehicle type may include information related to the degree to which the SOH of the battery decreases, as the accumulated driving distance of the host vehicle increases for each vehicle type. Furthermore, the SOH for each vehicle may include a degree to which the SOH of the battery decreases, as the duration when the battery is used increases. Furthermore, the SOH for each vehicle may include information related to a degree to which the SOH of the battery decreases, as the life cycle of the battery increases.

For example, the SOH for each vehicle type may be determined through the evaluation of the durability of the battery, which is performed in a process of developing a battery management system (BMS) for each vehicle type.

For example, the SOH for each vehicle type may be provided from an external server and may be stored in the memory 120. Furthermore, the SOH for each vehicle type may be updated by a system or a user.

According to an exemplary embodiment of the present disclosure, the processor 110 may monitor the SOH of the battery and may compare the reference SOH corresponding to the host vehicle among the SOHs for each vehicle type with the SOH of the battery of the host vehicle.

For example, the processor 110 may be configured to determine or predict the SOH of the battery of the host vehicle, based on at least one of a charging capacity when the battery is charged, charging energy when the battery is charged, a voltage drop for each output of the battery when the vehicle is traveling, or discharging energy of the battery, or any combination thereof.

For example, the processor 110 may monitor the SOH of the battery of the host vehicle and may allow a current SOH of the battery of the host vehicle according to the accumulated driving distance of the host vehicle, the duration of use of the battery of the host vehicle, the life cycle of the battery of the host vehicle, or the like, to correspond to the SOH for each vehicle type. The processor 110 may identify an SOH for each vehicle type, which corresponds to the current SOH of the battery of the host vehicle, among the SOHs for each vehicle type as the "reference SOH of the host vehicle".

For example, the processor 110 may set the reference SOH of the host vehicle depending on any one of the accumulated driving distance of the host vehicle, the duration of use of the battery, or the life cycle of the battery.

As a detailed example, the processor 110 may identify an SOH corresponding to a current accumulated driving distance of the host vehicle among the SOHs for each vehicle type as the reference SOH of the host vehicle and may compare the current SOH of the battery of the host vehicle with the reference SOH of the host vehicle. As an exemplary embodiment of the present disclosure, the processor 110 may identify an SOH corresponding to a duration when the battery of the host vehicle is used up to now among the SOHs for each vehicle type as the reference SOH of the host vehicle and may compare the current SOH of the battery of the host vehicle with the reference SOH of the host vehicle. As an exemplary embodiment of the present disclosure, the processor 110 may identify an SOH corresponding to a current life cycle of the battery of the host vehicle among the SOHs for each vehicle type as the reference SOH of the host vehicle and may compare the current SOH of the battery of the host vehicle with the reference SOH of the host vehicle.

According to an exemplary embodiment of the present disclosure, the processor 110 may compare the reference SOH of the host vehicle with the SOH of the battery of the host vehicle always or at a certain time period. For example, the processor 110 may be configured to compare the reference SOH of the host vehicle with the SOH of the battery of the host vehicle for each specific accumulated driving distance or may be configured to compare the reference SOH of the host vehicle with the SOH of the battery of the host vehicle for each specific life cycle.

According to an exemplary embodiment of the present disclosure, when the SOH of the battery of the host vehicle is smaller than the reference SOH of the host vehicle, which corresponds to the host vehicle, the processor 110 may be configured for controlling at least one of a temperature of the battery or an output of the battery, or any combination thereof.

For example, when the SOH of the battery of the host vehicle is smaller than the reference SOH of the host vehicle, which corresponds to the host vehicle, the processor 110 may be configured to determine that the durability of the battery of the host vehicle more decreases than average durability of the battery, which corresponds to the vehicle type of the host vehicle. In the instant case, the processor 110 may be configured to determine that there is a need for management for optimizing the battery of the host vehicle.

According to an exemplary embodiment of the present disclosure, when the SOH of the battery of the host vehicle is smaller than the reference SOH of the host vehicle, which corresponds to the host vehicle, the processor 110 may be configured for controlling a temperature of the battery of the host vehicle using a coolant so that the temperature of the battery of the host vehicle maintains an appropriate temperature range.

For example, when the temperature of the battery of the host vehicle is a low temperature deviating from the appropriate temperature range, the processor 110 may heat the coolant to increase the temperature of the battery.

For example, when the temperature of the battery of the host vehicle is a high temperature deviating from the appropriate temperature range, the processor 110 may cool the coolant to decrease the temperature of the battery.

According to an exemplary embodiment of the present disclosure, when the SOH of the battery of the host vehicle is smaller than the reference SOH of the host vehicle, which corresponds to the host vehicle, the processor 110 may be configured for controlling the output of the battery so that the burden that the output of the battery according to the driving of the host vehicle places on the SOH of the battery may decrease.

For example, when the SOH of the battery of the host vehicle is smaller than the reference SOH of the host vehicle, which corresponds to the host vehicle, the processor 110 may decrease the output of the battery according to the driving of the host vehicle. As a detailed example, when the SOH of the host vehicle is smaller than the reference SOH of the host vehicle, the processor 110 may decrease a magnitude of the output of the battery according to the acceleration of the host vehicle, a magnitude of the output of the battery according to the deceleration of the host vehicle, or a magnitude of the maximum output of the battery according to the driving of the host vehicle.

For example, compared with a battery output map when the SOH of the host vehicle is greater than or equal to the reference SOH of the host vehicle, when the SOH of the host vehicle is smaller than the reference SOH of the host vehicle, the processor 110 may derate the output of the battery.

According to an exemplary embodiment of the present disclosure, the processor 110 may be configured for controlling the coolant depending on a first heating condition to increase the temperature of the battery, based on that it is identified that the degree to which the SOH of the battery of the host vehicle is smaller than the reference SOH of the host vehicle is less than a predetermined difference value and that it is identified that the temperature of the battery is less than a first temperature including a low temperature at which the performance of the battery deteriorates, in the state in which the host vehicle is traveling.

For example, the predetermined difference value may be set to a value for dividing the number of times or a method for controlling the temperature of the battery or the number of times or a method for controlling the output of the battery to optimize the SOH of the battery of the host vehicle.

For example, when the difference between the SOH of the battery of the host vehicle and the reference SOH of the host vehicle is smaller than a predetermined value, the processor 110 may optimize the SOH of the battery although the number of times to control the temperature, output, or the like of the battery is small. On the other hand, when the difference between the SOH of the battery of the host vehicle and the reference SOH of the host vehicle is larger than the predetermined value, the processor 110 may require a relatively large number of times to control the temperature, output, or the like of the battery to optimize the SOH of the battery.

As a detailed example, when the degree to which the SOH of the battery of the host vehicle is smaller than the reference SOH of the host vehicle is less than a predetermined difference value, the processor 110 may set the number of times to output the temperature, output, or the like of the battery to one time. When the degree to which the SOH of the battery of the host vehicle is smaller than the reference SOH of the host vehicle is greater than or equal to the predetermined difference value, the processor 110 may set the number of times to output the temperature, output, or the like of the battery to two times or more.

According to an exemplary embodiment of the present disclosure, the processor 110 may identify whether the temperature of the battery of the host vehicle is less than the first temperature, in the state in which the host is traveling. Herein, the first temperature may include a low temperature at which the performance of the battery deteriorates. As a detailed example, the first temperature may be set to 10 degrees Celsius. The first temperature may be set different depending on a driving environment or a system setting.

For example, when it is identified that the temperature of the battery of the host vehicle is less than the first temperature, in the state in which the host vehicle is traveling, the processor 110 may be configured to determine that there is a risk that the performance of the battery may deteriorate. When the host vehicle continues traveling in the state in which the temperature of the battery of the host vehicle is less than the first temperature, the processor 110 may be configured to determine that it affects the SOH of the battery.

According to an exemplary embodiment of the present disclosure, the processor 110 may be configured for controlling the coolant of the host vehicle depending on the first heating condition or a second heating condition to increase the temperature of the battery. Herein, the coolant may include a coolant for cooling the battery or heating the battery.

For example, the first heating condition and the second heating condition may include at least one of a time to heat the coolant, a number of times to heat the coolant, a temperature at which the coolant is heated, a flow rate of the coolant, or a flow velocity of the coolant, or any combination thereof. As an exemplary embodiment of the present disclosure, the first heating condition and the second heating condition may be divided by making the number of times or the time to heat the coolant, which is included in the first heating condition, and the number of times or the time to heat the coolant, which is included in the second heating condition, different from each other, although the temperature at which the coolant is heated, which is included in the first heating condition, and the temperature at which the coolant is heated, which is included in the second heating condition, are the same as each other.

According to an exemplary embodiment of the present disclosure, the number of operations per day in the first heating condition and the number of operations per day in the second heating condition may be differently set. According to an exemplary embodiment of the present disclosure, the number of operations per day in the first heating condition may be set to be smaller than the number of operations per day in the second heating condition.

As a detailed example, when the predetermined difference value is 3% for the difference between the SOH of the battery of the host vehicle and the reference SOH of the host vehicle and when the first temperature is 10 degrees Celsius, the processor 110 may increase the temperature of the battery depending on the first heating condition as follow.

When it is identified that the degree to which the SOH of the battery of the host vehicle is smaller than the reference SOH of the host vehicle is less than 3% and when the temperature of the battery is measured as being less than 10 degrees Celsius in the state in which the host vehicle is traveling, the processor 110 may increase the temperature of the battery depending on the first heating condition for heating the coolant, for 1 hour each time, up to one time per day, until the temperature of the battery is 10 degrees Celsius.

According to an exemplary embodiment of the present disclosure, the processor 110 may be configured for controlling the coolant depending on the second heating condition to increase the temperature of the battery, based on that it is identified that the degree to which the SOH of the battery of the host vehicle is smaller than the reference SOH of the host vehicle is greater than or equal to the predetermined difference value and that it is identified that the temperature of the battery is less than the first temperature, in the state in which the host vehicle is traveling.

For example, when the degree to which the SOH of the battery of the host vehicle is smaller than the reference SOH of the host vehicle is greater than or equal to the predetermined difference value, the processor 110 may increase the temperature of the battery depending on the second heating condition for heating the coolant faster than the first heating condition or heating for a longer time than the first heating condition.

As an exemplary embodiment of the present disclosure, although the control associated with the coolant, included in the first heating condition, and the control associated with the coolant, which is included in the second heating condition, are the same as each other, the processor 110 may set the number of operations per day in the second heating condition to be greater than the number of operations per day in the first heating condition and may distinguish between the control according to the first heating condition and the control according to the second heating condition.

As a detailed example, when the predetermined difference value is 3% for the difference between the SOH of the battery of the host vehicle and the reference SOH of the host vehicle and when the first temperature is 10 degrees Celsius, the processor 110 may increase the temperature of the battery depending on the second heating condition as follow.

When it is identified that the degree to which the SOH of the battery of the host vehicle is smaller than the reference SOH of the host vehicle is less than 3% and when the temperature of the battery is measured as being less than 10 degrees Celsius in the state in which the host vehicle is traveling, the processor 110 may increase the temperature of the battery depending on the second heating condition for heating the coolant, for 1 hour each time, up to two times per day, until the temperature of the battery is 10 degrees Celsius.

According to an exemplary embodiment of the present disclosure, the processor 110 may be configured for controlling the coolant depending on a first cooling condition to decrease the temperature of the battery, based on that it is identified that the degree to which the SOH of the battery is smaller than the reference SOH of the host vehicle is less than the predetermined difference value and that it is identified that the temperature of the battery is greater than a second temperature including a high temperature at which the performance of the battery deteriorates, in the state in which the host vehicle is traveling.

According to an exemplary embodiment of the present disclosure, the processor 110 may identify whether the temperature of the battery of the host vehicle is greater than the second temperature, in the state in which the host is traveling. Herein, the second temperature may include a high temperature at which the performance of the battery deteriorates. As a detailed example, the second temperature may be set to 40 degrees Celsius. The second temperature may be set different depending on the driving environment or the system setting.

For example, when it is identified that the temperature of the battery of the host vehicle is greater than the second temperature, in the state in which the host vehicle is traveling, the processor 110 may be configured to determine that there is a risk that the performance of the battery may deteriorate. When the host vehicle continues traveling in the state in which the temperature of the battery of the host vehicle is greater than the second temperature, the processor 110 may be configured to determine that it affects the SOH of the battery.

According to an exemplary embodiment of the present disclosure, the processor 110 may be configured for controlling the coolant of the host vehicle depending on the first cooling condition or a second cooling condition to decrease the temperature of the battery.

For example, the first cooling condition and the second cooling condition may include at least one of a time to cool the coolant, a number of times to cool the coolant, a temperature at which the coolant is cooled, instant cooling performance, or a time when the coolant is maintained, or any combination thereof.

According to an exemplary embodiment of the present disclosure, the instant cooling performance may include performance for improving an instant output of the coolant. For example, the instant cooling performance may be determined based on at least one of a degree to which the flow rate of the coolant increases or a degree to which the flow velocity of the coolant increases, or any combination thereof. As a detailed example, the processor 110 may increase a flow rate of the coolant passing through the same cross-sectional area or may increase a flow velocity of the coolant to improve the instant cooling performance.

According to an exemplary embodiment of the present disclosure, the first cooling condition and the second cooling condition may be divided by making the time when the coolant is maintained, which is included in the first cooling condition, and the time when the coolant is maintained, which is included in the second cooling condition, different from each other, although the instant cooling performance included in the first cooling condition and the instant cooling performance included in the second cooling condition are the same as each other. The first cooling condition and the second cooling condition may be conditions applied in the state in which the vehicle is traveling.

As a detailed example, when the predetermined difference value is 3% for the difference between the SOH of the battery of the host vehicle and the reference SOH of the host vehicle and when the second temperature is 40 degrees Celsius, the processor 110 may decrease the temperature of the battery depending on the first cooling condition as follows.

When it is identified that the degree to which the SOH of the battery of the host vehicle is smaller than the reference SOH of the host vehicle is less than 3% and when temperature of the battery is measured as being greater than 40 degrees Celsius in the state in which the host vehicle is traveling, the processor 110 may decrease the temperature of the battery depending on the first cooling condition for improving instant output performance of the coolant for 30 minutes, until the temperature of the battery is 30 degrees Celsius.

According to an exemplary embodiment of the present disclosure, the processor 110 may be configured for controlling the coolant depending on the second cooling condition to decrease the temperature of the battery, based on that it is identified that the degree to which the SOH of the battery is smaller than the reference SOH of the host vehicle is greater than or equal to the predetermined difference value and that it is identified that the temperature of the battery is greater than the second temperature, in the state in which the host vehicle is traveling.

As a detailed example, when the predetermined difference value is 3% for the difference between the SOH of the battery of the host vehicle and the reference SOH of the host vehicle and when the second temperature is 40 degrees Celsius, the processor 110 may decrease the temperature of the battery depending on the second cooling condition as follows.

When it is identified that the degree to which the SOH of the battery of the host vehicle is smaller than the reference SOH of the host vehicle is greater than or equal to 3% and when the temperature of the battery is measured as being greater than 40 degrees Celsius in the state in which the host vehicle is traveling, the processor 110 may decrease the temperature of the battery depending on the second heating condition for improving instant output performance of the coolant for one hour each time, until the temperature of the battery is 30 degrees Celsius.

According to an exemplary embodiment of the present disclosure, the processor 110 may be configured for controlling the coolant depending on a third cooling condition to decrease the temperature of the battery, based on that it is identified that the degree to which the SOH of the battery is smaller than the reference SOH of the host vehicle is less than the predetermined difference value and that it is identified that the temperature of the battery is greater than the second temperature including the high temperature at which the performance of the battery deteriorates, in a state in which the host vehicle is not traveling.

According to an exemplary embodiment of the present disclosure, the processor 110 may be configured for controlling the coolant of the host vehicle depending on the third cooling condition or a fourth cooling condition to decrease the temperature of the battery, in the state in which the host vehicle is not traveling.

For example, the third cooling condition and the third cooling condition may include at least one of a time to cool the coolant, a number of times to cool the coolant, a temperature at which the coolant is cooled, instant cooling performance, or a time when the coolant is maintained, or any combination thereof. As an exemplary embodiment of the present disclosure, the third cooling condition and the fourth cooling condition may be divided by making the number of times or the time to cool the coolant, which is included in the third cooling condition, and the number of times or the time to cool the coolant, which is included in the fourth cooling condition, different from each other, although the temperature at which the coolant is cooled, which is included the third cooling condition, and the temperature at which the coolant is cooled, which is included the fourth cooling condition, are the same as each other.

According to an exemplary embodiment of the present disclosure, the number of operations per day in the third cooling condition and the number of operations per day in the fourth cooling condition may be differently set. According to an exemplary embodiment of the present disclosure, the number of operations per day in the third cooling condition may be set to be smaller than the number of operations per day in the fourth cooling condition.

As a detailed example, when the predetermined difference value is 3% for the difference between the SOH of the battery of the host vehicle and the reference SOH of the host vehicle and when the second temperature is 40 degrees Celsius, the processor 110 may decrease the temperature of the battery depending on the third cooling condition as follows.

When it is identified that the degree to which the SOH of the battery of the host vehicle is smaller than the reference SOH of the host vehicle is less than 3% and when the temperature of the battery is measured as being greater than 40 degrees Celsius in the state in which the host vehicle is not traveling, the processor 110 may decrease the temperature of the battery depending on the third cooling condition for cooling the coolant, for 1 hour each time, up to one time per day, until the temperature of the battery is 30 degrees Celsius.

According to an exemplary embodiment of the present disclosure, the processor 110 may be configured for controlling the coolant depending on the fourth cooling condition to decrease the temperature of the battery, based on that it is identified that the degree to which the SOH of the battery is smaller than the reference SOH of the host vehicle is greater than or equal to the predetermined difference value and that it is identified that the temperature of the battery is greater than the second temperature, in the state in which the host vehicle is not traveling.

As a detailed example, when the predetermined difference value is 3% for the difference between the SOH of the battery of the host vehicle and the reference SOH of the host vehicle and when the second temperature is 40 degrees Celsius, the processor 110 may decrease the temperature of the battery depending on the fourth cooling condition as follows.

When it is identified that the degree to which the SOH of the battery of the host vehicle is smaller than the reference SOH of the host vehicle is greater than or equal to 3% and when the temperature of the battery is measured as being greater than 40 degrees Celsius in the state in which the host vehicle is not traveling, the processor 110 may decrease the temperature of the battery depending on the fourth cooling condition for cooling the coolant, for 1 hour each time, up to two times per day, until the temperature of the battery is 30 degrees Celsius.

According to an exemplary embodiment of the present disclosure, the processor 110 may more decrease the output of the battery than an output of the battery when the SOH of the battery of the host vehicle is not smaller than the reference SOH of the host vehicle, depending on a first output condition, in the state in which the host vehicle is traveling, based on that it is identified that the degree to which the SOH of the battery is smaller than the reference SOH of the host vehicle is less than the predetermined difference value.

According to an exemplary embodiment of the present disclosure, when the host vehicle is traveling, the processor 110 may be configured for controlling the output of the battery depending on the first output condition or a second output condition.

For example, the output of the battery while the host vehicle is traveling according to the first output condition may be set to be smaller than the output of the battery while the host vehicle is traveling according to the second output condition or a maximum output of the battery according to the first output condition may be set to be smaller than a maximum output of the battery according to the second output condition. In other words, a burden on the SOH of the battery when controlling the output of the battery depending on the second output condition may more decrease than a burden on the SOH of the battery when controlling the output of the battery depending on the first output condition.

As a detailed example, when the predetermined difference value is 3% for the difference between the SOH of the battery of the host vehicle and the reference SOH of the host vehicle, the processor 110 may decrease the output of the battery depending on the first output condition as follows.

When it is identified that the degree to which the SOH of the battery of the host vehicle is smaller than the reference SOH of the host vehicle is less than 3% and when the host vehicle is traveling, the processor 110 may more decrease the output of the battery by 10% than the output of the battery when the SOH of the battery of the host vehicle is not smaller than the reference SOH of the host vehicle or may decrease the maximum output of the battery of the host vehicle by 10%.

According to an exemplary embodiment of the present disclosure, the processor 110 may more decrease the output of the battery than the output of the battery when the SOH of the battery of the host vehicle is not smaller than the reference SOH of the host vehicle, depending on the second output condition, in the state in which the host vehicle is traveling, based on that it is identified that the degree to which the SOH of the battery is smaller than the reference SOH of the host vehicle is greater than or equal to the predetermined difference value.

As a detailed example, when the predetermined difference value is 3% for the difference between the SOH of the battery of the host vehicle and the reference SOH of the host vehicle, the processor 110 may decrease the output of the battery depending on the second output condition as follows.

When it is identified that the degree to which the SOH of the battery of the host vehicle is smaller than the reference SOH of the host vehicle is greater than or equal to 3% and when the host vehicle is traveling, the processor 110 may more decrease the output of the battery by 15% than the output of the battery when the SOH of the battery of the host vehicle is not smaller than the reference SOH of the host vehicle or may decrease the maximum output of the battery of the host vehicle by 15%.

According to an exemplary embodiment of the present disclosure, contents included in the first heating condition, the second heating condition, the first cooling condition, the second cooling condition, the third cooling condition, the fourth cooling condition, the first output condition, or the second output condition may be set according to the amount of control necessary to match the SOH of the battery of the host vehicle with the reference SOH of the host vehicle.

For example, the amount of control necessary to match the SOH of the battery of the host vehicle with the reference SOH of the host vehicle may be determined with regard to the amount of energy which remains in the battery of the host vehicle, the amount of energy necessary to warm up the host vehicle, or the like.

For example, when the amount of energy which remains in the battery of the host vehicle is smaller than a predetermined amount or when the amount of energy necessary to warm up the host vehicle is large, the amount of control for the temperature of the battery or the output of the battery may be set different.

As a detailed example, as it is identified that the degree to which the SOH of the battery is smaller than the reference SOH of the host vehicle is less than the predetermined difference value, although the processor 110 should decrease the maximum output of the battery by 10% depending on the first output condition, when the amount of energy which remains in the battery of the host vehicle is small, the processor 110 may decrease the maximum output of the battery by 15%.

According to an exemplary embodiment of the present disclosure, when it is identified that the SOH of the battery of the host vehicle is smaller than the reference SOH of the host vehicle, the processor 110 may provide the user with information related to the SOH of the battery of the host vehicle.

For example, the processor 110 may provide the information related to the SOH of the battery of the host vehicle through the infotainment of the host vehicle. As a detailed example, the user may identify the information related to the SOH of the battery by a display, an audio, or the like of the host vehicle.

According to an exemplary embodiment of the present disclosure, when it is identified that the SOH of the battery of the host vehicle is smaller than the reference SOH of the host vehicle, the processor 110 may provide a notification for selecting whether to control at least one of the temperature of the battery or the output of the battery, or any combination thereof. For example, the processor 110 may provide a notification for querying the user whether to control the temperature of the battery or the output of the battery, through the infotainment of the host vehicle. As a detailed example, the user may select whether to control the temperature of the battery or the output of the battery, by a touch display, an input device, a microphone, or the like of the host vehicle.

According to an exemplary embodiment of the present disclosure, when it is identified that the SOH of the battery of the host vehicle is smaller than the reference SOH of the host vehicle, the processor 110 may provide a notification for recommending whether to control at least one of the temperature of the battery or the output of the battery, or any combination thereof.

According to an exemplary embodiment of the present disclosure, the user may easily manage the durability and safety of the battery of the host vehicle, depending on receiving the information related to the SOH of the battery of the host vehicle from the processor 110 and directly selecting whether to control the temperature or output of the battery.

According to an exemplary embodiment of the present disclosure, when the temperature of the battery reaches a temperature at which the performance of the battery does not deteriorate, the processor 110 may end the control of the at least one of the temperature of the battery or the output of the battery, or the any combination thereof.

For example, the temperature at which the performance of the battery does not deteriorate may include a range between the first temperature and the second temperature. As a detailed example, the range of an appropriate temperature at which the performance of the battery does not deteriorate may be set to a temperature between 10 degrees Celsius and 30 degrees Celsius. The range of the appropriate temperature may be set different by the driving environment or system of the host vehicle.

For example, when the temperature of the battery of the host vehicle reaches the range of the appropriate temperature by controlling the temperature of the battery or the output of the battery, the processor 110 may end the control of the temperature of the battery or the output of the battery for the efficiency of energy or preventing unnecessary control.

According to an exemplary embodiment of the present disclosure, when the SOH of the battery reaches the reference SOH of the host vehicle, the processor 110 may end the control of the at least one of the temperature of the battery or the output of the battery, or the any combination thereof.

For example, the processor 110 may be configured for controlling the temperature of the battery or the output of the battery depending on the set control condition (e.g., the heating condition, the cooling condition, the output condition, or the like).

For example, when the SOH of the battery reaches the reference SOH of the host vehicle, the processor 110 may end the control of the temperature of the battery or the output of the battery for the efficiency of energy or preventing unnecessary control.

Figure 2:
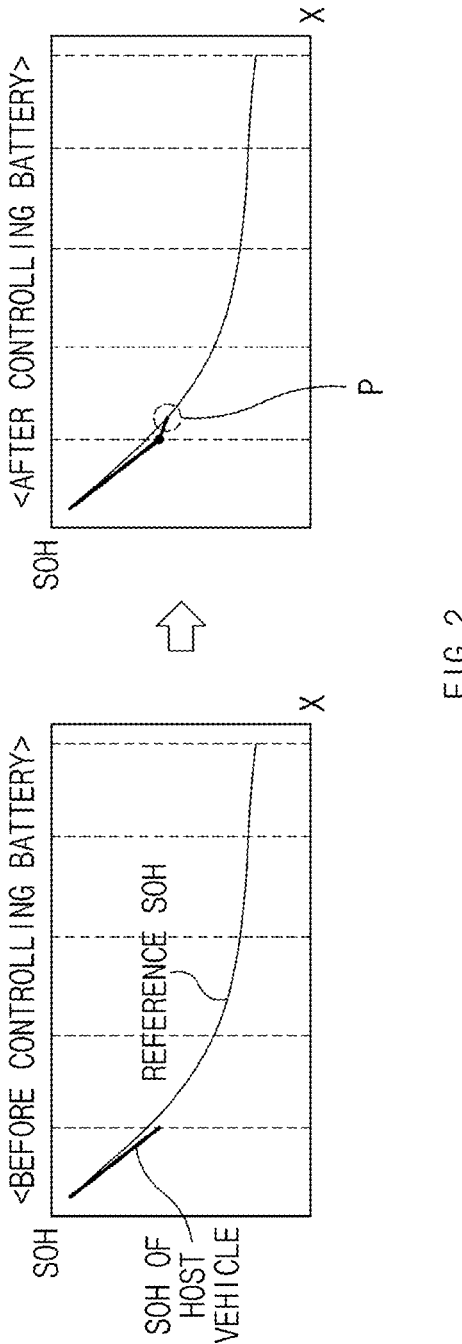
FIG. 2 is a graph illustrating an example of matching an SOH of a host vehicle, which is smaller than a reference SOH of a host vehicle before controlling a battery, with the reference SOH of the host vehicle after controlling the battery, in a vehicle control apparatus according to an exemplary embodiment of the present disclosure.

FIG. 2 is a graph illustrating an example of matching an SOH of a host vehicle, which is smaller than a reference SOH of a host vehicle before controlling a battery, with the reference SOH of the host vehicle after controlling the battery, in a vehicle control apparatus according to an exemplary embodiment of the present disclosure.

Referring to the graph of FIG. 2 according to an exemplary embodiment of the present disclosure, the vertical axis may refer to the SOH and the horizontal axis X may refer to the accumulated driving distance of the host vehicle, the duration of use of the battery, or the life cycle of the battery. For example, the more the accumulated driving distance of the host vehicle, the duration of use of the battery, or the life cycle of the battery, the more the SOH of the battery of the host vehicle may decrease.

Referring to the graph before controlling the battery in FIG. 2 according to an exemplary embodiment of the present disclosure, the degree to which the SOH of the battery of the host vehicle decreases may be greater than the degree to which the reference SOH of the host vehicle decreases, depending on a driving environment of the host vehicle or a driving characteristic of a driver of the host vehicle. In the instant case, there may be a need for control for managing the SOH of the battery of the host vehicle.

Referring to the graph after controlling the battery in FIG. 2 according to an exemplary embodiment of the present disclosure, the temperature of the battery or the output of the battery may be controlled to optimize the SOH of the battery of the host vehicle so that the SOH of the battery of the host vehicle is matched with the reference SOH of the host vehicle.

For example, when continuously controlling the temperature of the battery or the output of the battery, as the accumulated driving distance of the host vehicle or the like increases, a vehicle control apparatus according to an exemplary embodiment of the present disclosure may increase the SOH of the battery of the host vehicle to a point P corresponding to the reference SOH of the host vehicle.

Depending on FIG. 2 according to an exemplary embodiment of the present disclosure, although the SOH of the battery of the host vehicle more decreases than the reference SOH of the host vehicle, the temperature of the battery or the output of the battery may be controlled to optimize the SOH of the battery of the host vehicle so that the SOH of the battery of the host vehicle is matched with the reference SOH of the host vehicle.

Figure 3:
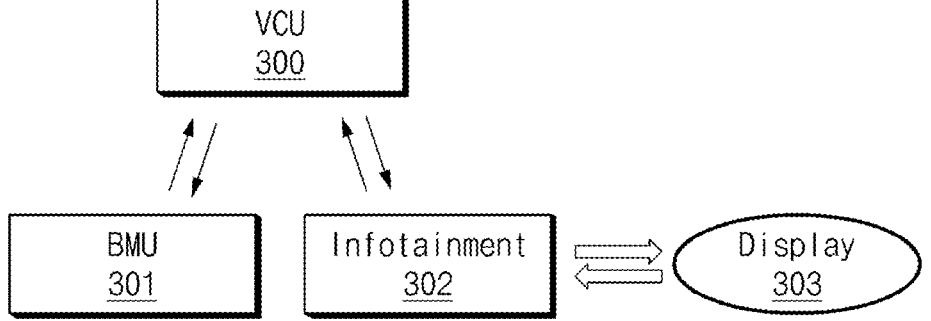
FIG. 3 is a drawing illustrating an example of a relationship between a vehicle control unit (VCU) and a battery management unit (BMU) and infotainment, which interact with each other, according to an exemplary embodiment of the present disclosure.

FIG. 3 is a drawing illustrating an example of a relationship between a vehicle control unit (VCU) and a battery management unit (BMU) and infotainment, which interact with each other, according to an exemplary embodiment of the present disclosure.

According to an exemplary embodiment of the present disclosure, a VCU 300 may transmit and receive data with the BMU 301 and infotainment 302.

For example, when the SOH of the battery of a host vehicle is smaller than a reference SOH of the host vehicle, the BMU 301 may transmit data associated with the SOH of the battery of the host vehicle, which corresponds to the reference SOH of the host vehicle, to the VCU 300.

For example, when it is identified that the SOH of the battery of the host vehicle is smaller than the reference SOH of the host vehicle, the VCU 300 may deliver data about the SOH of the battery of the host vehicle to a user.

For example, the infotainment 302 may provide the data about the SOH of the battery of the host vehicle through a display 303. Furthermore, the infotainment 302 may provide the user with a notification for querying whether to control a temperature of the battery or an output of the battery to optimize the SOH of the battery of the host vehicle, through the display 303. In the instant case, the user may select whether to control the temperature of the battery or the output of the battery, using a touch display, a microphone, other input devices, or the like.

For example, the infotainment 302 may transmit the result of selecting whether to control the temperature of the battery or the output of the battery by the user to the VCU 300. The VCU 300 may be configured for controlling the temperature of the battery or the output of the battery, depending on the result selected by the user.

According to FIG. 3 according to an exemplary embodiment of the present disclosure, the VCU 300 may receive data associated with the SOH of the battery of the host vehicle, which corresponds to the reference SOH of the host vehicle, from the BMU 301 and may provide the user with data associated with the SOH of the battery of the host vehicle through the infotainment 302, thus allowing the user to directly select control of the temperature of the battery or the output of the battery.

Figure 4:
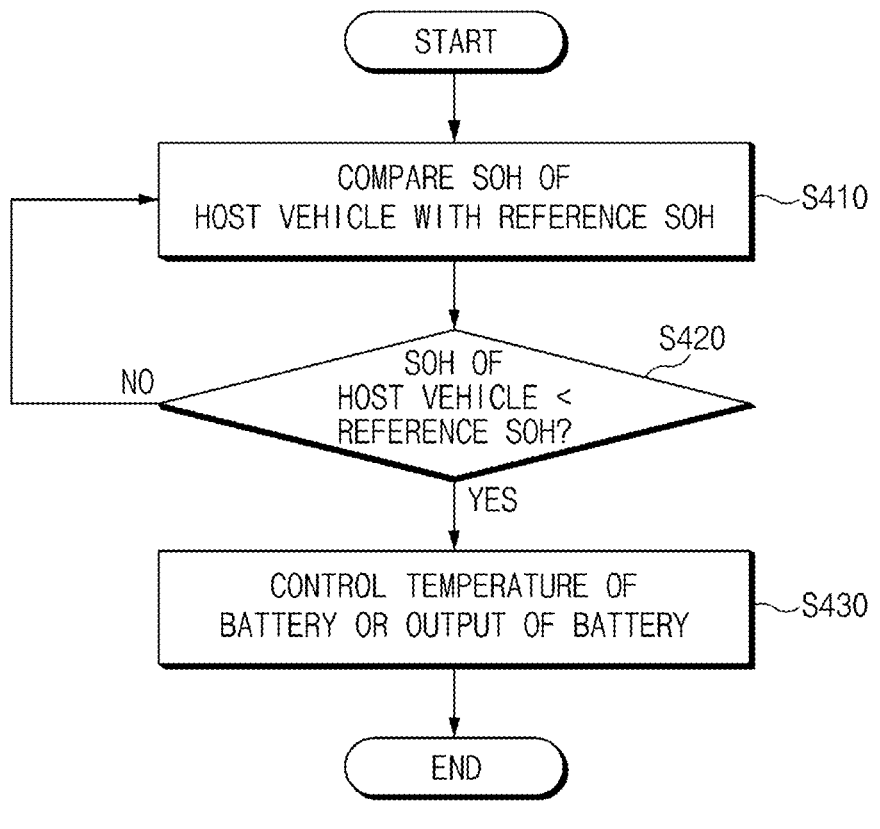
FIG. 4 is a flowchart illustrating a vehicle control apparatus or a vehicle control method according to an exemplary embodiment of the present disclosure.

FIG. 4 is a flowchart illustrating a vehicle control apparatus or a vehicle control method according to an exemplary embodiment of the present disclosure.

According to an exemplary embodiment of the present disclosure, in S410, a processor may compare a reference state of health (SOH) of a host vehicle, which corresponds to the host vehicle, among SOHs for each vehicle type, which are obtained through the evaluation of the durability of a battery for each vehicle type, with an SOH of a battery of the host vehicle.

According to an exemplary embodiment of the present disclosure, in S420, the processor may identify whether the SOH of the battery of the host vehicle is smaller than the reference SOH of the host vehicle, which corresponds to the host vehicle, among the SOHs for each vehicle type, which are obtained through the evaluation of the durability of the battery for each vehicle type.

For example, because there is no need to optimize the SOH of the battery of the host vehicle, when the SOH of the battery of the host vehicle is not smaller than the reference SOH of the host vehicle, in S410, the processor may continuously perform monitoring for comparing the reference SOH of the host vehicle with the SOH of the battery of the host vehicle.

For example, because there is a need to optimize the SOH of the battery of the host vehicle, when the SOH of the battery of the host vehicle is smaller than the reference SOH of the host vehicle, in S430, the processor is configured for controlling a temperature of the battery or an output of the battery. In the instant case, the processor may provide a notification for querying a user whether to control the temperature of the battery or the output of the battery.

Figure 5:
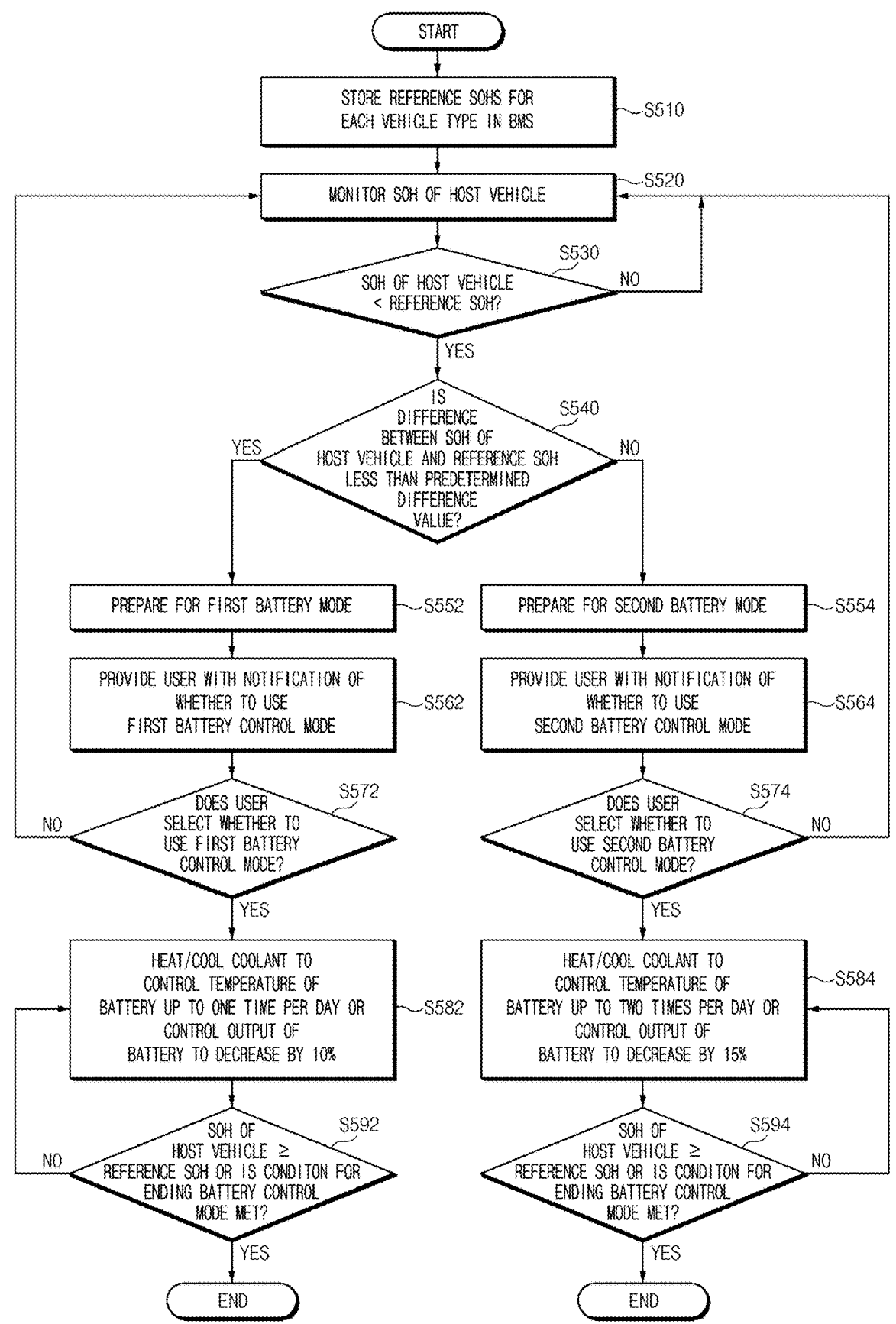
FIG. 5 is a flowchart for describing an example of varying a battery control mode depending a degree to which an SOH of a host vehicle is smaller than a reference SOH of the host vehicle, in a vehicle control apparatus or a vehicle control method according to an exemplary embodiment of the present disclosure.

FIG. 5 is a flowchart for describing an example of varying a battery control mode depending a degree to which an SOH of a host vehicle is smaller than a reference SOH of the host vehicle, in a vehicle control apparatus or a vehicle control method according to an exemplary embodiment of the present disclosure.

According to an exemplary embodiment of the present disclosure, in S510, a processor may store reference SOHs for each vehicle type in a battery management system (BMS) of a host vehicle. For example, the reference SOHs for each vehicle type may be stored in a memory of a vehicle control apparatus.

According to an exemplary embodiment of the present disclosure, in S520, the processor may monitor an SOH of the battery of the host vehicle. For example, the processor is configured to determine or predict the SOH of the battery of the host vehicle, based on at least one of a charging capacity when the battery is charged, charging energy when the battery is charged, a voltage drop for each output of the battery when the vehicle is traveling, or discharging energy of the battery, or any combination thereof.

For example, the processor may identify an SOH for each vehicle type, which corresponds to the current SOH of the battery of the host vehicle, among the SOHs for each vehicle type as the "reference SOH of the host vehicle".

According to an exemplary embodiment of the present disclosure, the processor may compare the SOH of the battery of the host vehicle with the reference SOH of the host vehicle. For example, in S530, the processor is configured to determine whether the SOH of the host vehicle is smaller than the reference SOH of the host vehicle. At the instant time, because there is no need to optimize the SOH of the battery of the host vehicle, when the SOH of the battery of the host vehicle is not smaller than the reference SOH of the host vehicle, in S520, the processor may continuously perform monitoring for comparing the reference SOH of the host vehicle with the SOH of the battery of the host vehicle.

According to an exemplary embodiment of the present disclosure, when the SOH of the battery of the host vehicle is smaller than the reference SOH of the host vehicle, in S540, the processor is configured to determine whether a degree to which the SOH of the battery of the host vehicle is smaller than the reference SOH of the host vehicle is less than a predetermined difference value. For example, the predetermined difference value may be set to a value for dividing the number of times or a method for controlling the temperature of the battery or the number of times or a method for controlling the output of the battery to optimize the SOH of the battery of the host vehicle.

According to an exemplary embodiment of the present disclosure, the processor may distinguish a battery control mode, depending on that the degree to which the SOH of the battery of the host vehicle is smaller than the reference SOH of the host vehicle is less than the predetermined difference value.

According to an exemplary embodiment of the present disclosure, in S552, when the degree to which the SOH of the battery of the host vehicle is smaller than the reference SOH of the host vehicle is less than the predetermined difference value, the processor may prepare for a first battery control mode. For example, when preparing for the first battery control mode, in S562, the processor may provide a user with a notification of whether to use the first battery control mode. In the instant case, the processor may provide the user with the notification of whether to use the first battery control mode through a display or the like of the host vehicle.

According to an exemplary embodiment of the present disclosure, in S572, the user may select whether to use the first battery control mode. When the user does not use the first battery control mode, in S520, the processor is configured to continue monitoring the SOH of the battery of the host vehicle, without controlling the temperature of the battery or the output of the battery.

According to an exemplary embodiment of the present disclosure, when the user utilizes the first battery control mode, in S582, the processor may heat or cool a coolant to control the temperature of the battery or control the output of the battery.

For example, the first battery control mode may be set to control the temperature of the battery up to one time per day using the coolant. Furthermore, for example, the first battery control mode may be set to decrease the output of the battery by 10%.

According to an exemplary embodiment of the present disclosure, in S592, the processor is configured to determine whether the SOH of the battery of the host vehicle is greater than or equal to the reference SOH of the host vehicle or whether a condition for ending a battery control mode is met.

For example, when the SOH of the battery of the host vehicle is greater than or equal to the reference SOH of the host vehicle, the processor may end the battery control mode. For example, when the SOH of the battery of the host vehicle is not greater than or equal to the reference SOH of the host vehicle, in S582, the processor is configured for controlling the temperature of the battery or the output of the battery, depending on the first battery control mode.

For example, when the condition for ending the battery control mode is met, the processor may end the battery control mode. The condition for ending the battery control mode may include a case where it is determined that it is difficult to match the SOH of the battery of the host vehicle with the reference SOH of the host vehicle, although the temperature of the battery or the output of the battery is controlled. As a detailed example, the condition for ending the battery control mode may include a case where there is no change in the SOH of the battery of the host vehicle, although the host vehicle drives at a predetermined driving distance or more while controlling the temperature of the battery or the output of the battery. Herein, the specific driving distance may be to, for example, 10,000 km.

According to an exemplary embodiment of the present disclosure, when the degree to which the SOH of the battery of the host vehicle is smaller than the reference SOH of the host vehicle is greater than or equal to the predetermined difference value, the processor may prepare for a second battery control mode in S554. For example, when preparing for the second battery control mode, in S564, the processor may provide the user with a notification of whether to use the second battery control mode. In the instant case, the processor may provide the user with the notification of whether to use the second battery control mode through the display or the like of the host vehicle.

According to an exemplary embodiment of the present disclosure, in S574, the user may select whether to use the second battery control mode. When the user does not use the second battery control mode, in S574, the processor is configured to continue monitoring the SOH of the battery of the host vehicle, without controlling the temperature of the battery or the output of the battery.

According to an exemplary embodiment of the present disclosure, the processor may distinguish a battery control mode, depending on that the degree to which the SOH of the battery of the host vehicle is smaller than the reference SOH of the host vehicle is less than the predetermined difference value.

According to an exemplary embodiment of the present disclosure, when the degree to which the SOH of the battery of the host vehicle is smaller than the reference SOH of the host vehicle is less than the predetermined difference value, in S552, the processor may prepare for the first battery control mode. For example, when preparing for the first battery control mode, in S562, the processor may provide the user with the notification of whether to use the first battery control mode. In the instant case, the processor may provide the user with the notification of whether to use the first battery control mode through the display or the like of the host vehicle.

According to an exemplary embodiment of the present disclosure, in S572, the user may select whether to use the first battery control mode. When the user does not use the first battery control mode, in S572, the processor is configured to continue monitoring the SOH of the battery of the host vehicle, without controlling the temperature of the battery or the output of the battery.

According to an exemplary embodiment of the present disclosure, when the user utilizes the second battery control mode, in S584, the processor is configured to perform control for making the number of times to control the temperature of the battery or the degree to which the output of the battery decreases different from the first battery control mode.

For example, the second battery control mode may be set to control the temperature of the battery up to two times per day using the coolant. Furthermore, for example, the second battery control mode may be set to decrease the output of the battery by 15%.

According to an exemplary embodiment of the present disclosure, in S594, the processor is configured to determine whether the SOH of the battery of the host vehicle is greater than or equal to the reference SOH of the host vehicle or whether the condition for ending the battery control mode is met.

For example, when the SOH of the battery of the host vehicle is greater than or equal to the reference SOH of the host vehicle, the processor may end the battery control mode. For example, when the SOH of the battery of the host vehicle is not greater than or equal to the reference SOH of the host vehicle, in S584, the processor is configured for controlling the temperature of the battery or the output of the battery, depending on the second battery control mode.

For example, when the condition for ending the battery control mode is met, the processor may end the battery control mode. The condition for ending the battery control mode may include a case where it is determined that it is difficult to match the SOH of the battery of the host vehicle with the reference SOH of the host vehicle, although the temperature of the battery or the output of the battery is controlled. As a detailed example, the condition for ending the battery control mode may include a case where there is no change in the SOH of the battery of the host vehicle, although the host vehicle drives at a predetermined driving distance or more while controlling the temperature of the battery or the output of the battery. Herein, the specific driving distance may be to, for example, 10,000 km.

Figure 6:
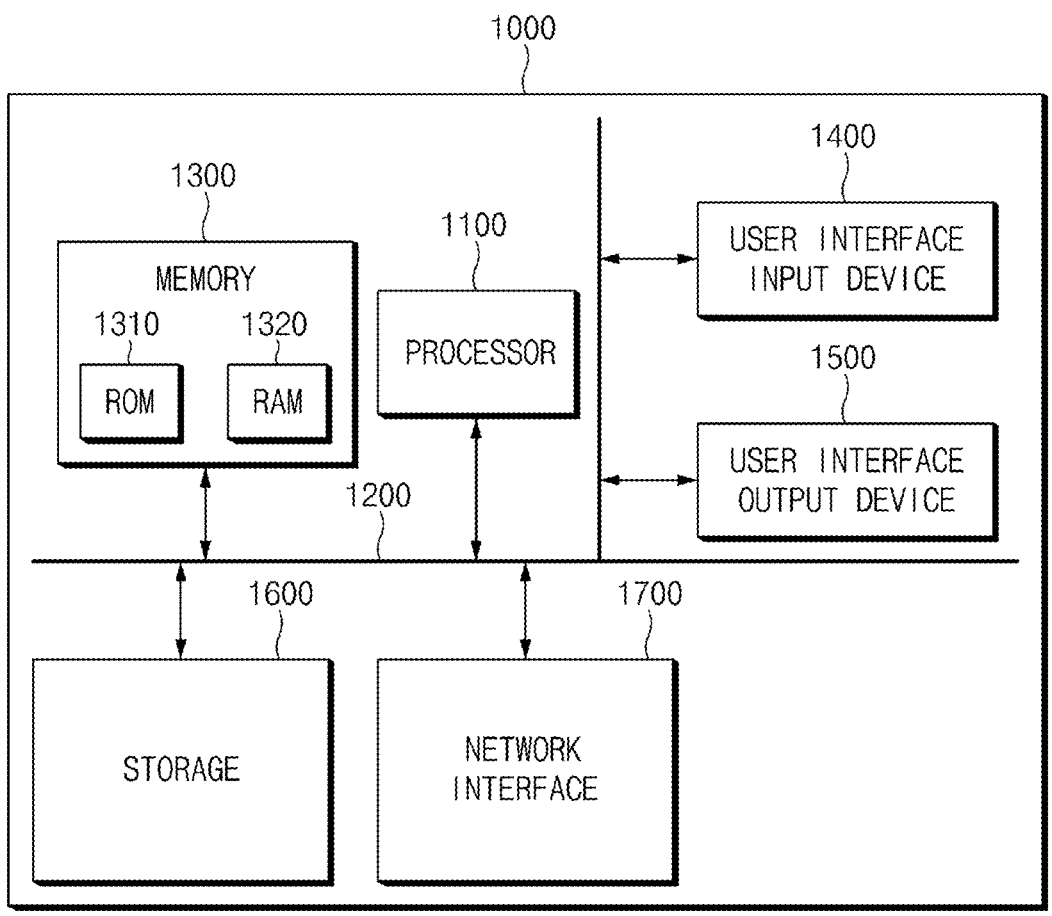
FIG. 6 illustrates a computing system associated with a vehicle control apparatus or a vehicle control method according to an exemplary embodiment of the present disclosure.

FIG. 6 illustrates a computing system associated with a vehicle control apparatus or a vehicle control method according to an exemplary embodiment of the present disclosure.

Referring to FIG. 6, a computing system 1000 may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the exemplary embodiments included in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may be configured for controlling a temperature of a battery of a host vehicle or an output of the battery to optimize an SOH of the battery of the host vehicle, when the SOH of the battery of the host vehicle is smaller than a reference SOH.

Furthermore, the present technology may provide a user with a notification that the SOH of the battery of the host vehicle is smaller than the reference SOH, when the SOH of the battery of the host vehicle is smaller than the reference SOH, to allow the user to select whether to perform control for managing the SOH of the battery of the host vehicle so that the user may manage the SOH of the battery on his or her own.

Furthermore, the present technology may be configured for controlling the temperature of the battery or the output of the battery to optimize the SOH of the battery of the host vehicle so that the user safely utilizes the host vehicle for a long time.

Furthermore, the present technology may monitor whether the SOH of the battery of the host vehicle is smaller than the reference SOH, using SOHs of batteries for each vehicle type, which are obtained through the evaluation of the durability of the batteries for each vehicle type.

Furthermore, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle control apparatus, comprising:

a memory storing a program instruction; and a processor configured to execute the program instruction, wherein the processor is configured to:

obtain reference states of health (SOHs) for each vehicle type, the reference SOHs being determined through evaluation of durability of batteries for each vehicle type;

identify which vehicle type of battery a battery of a host vehicle corresponds to;

identify a reference SOH of the host vehicle, the reference SOH corresponding to the battery of the host vehicle, among the reference SOHs for each vehicle type; and control at least one of a temperature of the battery or an output of the battery, or any combination thereof, based on that the processor identifies that an SOH of the battery of the host vehicle is smaller than the reference SOH of the host vehicle, wherein the processor is further configured to:

control a coolant depending on a first heating condition to increase the temperature of the battery, based on that the processor identifies that a degree to which the SOH of the battery is smaller than the reference SOH of the host vehicle is less than a predetermined difference value and that the processor identifies that the temperature of the battery is less than a first temperature including a low temperature at which performance of the battery deteriorates, in a state in which the host vehicle is traveling; or control the coolant depending on a second heating condition to increase the temperature of the battery, based on that the processor identifies that the degree to which the SOH of the battery is smaller than the reference SOH of the host vehicle is greater than or equal to the predetermined difference value and that the processor identifies that the temperature of the battery is less than the first temperature, in the state in which the host vehicle is traveling, wherein the first heating condition and the second heating condition include at least one of a time to heat the coolant, a number of times to heat the coolant, a temperature at which the coolant is heated, a flow rate of the coolant, or a flow velocity of the coolant, or any combination thereof, wherein a number of operations per day in the first heating condition is set to be smaller than a number of operations per day in the second heating condition, and wherein the operations include an operation for heating the coolant, an operation for controlling the flow rate of the coolant, or an operation for controlling the flow velocity of the coolant or any combination thereof.

2. The vehicle control apparatus of claim 1, wherein the processor is further configured to:

control the coolant depending on a first cooling condition to decrease the temperature of the battery, based on that the processor identifies that a degree to which the SOH of the battery is smaller than the reference SOH of the host vehicle is less than a predetermined difference value and that the processor identifies that the temperature of the battery is greater than a second temperature including a high temperature at which performance of the battery deteriorates, in a state in which the host vehicle is traveling; or control the coolant depending on a second cooling condition to decrease the temperature of the battery, based on that the processor identifies that the degree to which the SOH of the battery is smaller than the reference SOH of the host vehicle is greater than or equal to the predetermined difference value and that the processor identifies that the temperature of the battery is greater than the second temperature, in the state in which the host vehicle is traveling, wherein the first cooling condition and the second cooling condition include at least one of a time to cool the coolant, a number of times to cool the coolant, a temperature at which the coolant is cooled, instant cooling performance, or a time when the coolant is maintained, or any combination thereof.

3. The vehicle control apparatus of claim 2, wherein the instant cooling performance is determined based on at least one of a degree to which a flow rate of the coolant increases or a degree to which a flow velocity of the coolant increases, or any combination thereof.

4. The vehicle control apparatus of claim 1, wherein the processor is further configured to:

control the coolant depending on a third cooling condition to decrease the temperature of the battery, based on that the processor identifies that a degree to which the SOH of the battery is smaller than the reference SOH of the host vehicle is less than a predetermined difference value and that the processor identifies that the temperature of the battery is greater than a second temperature including a high temperature at which performance of the battery deteriorates, in a state in which the host vehicle is not traveling; or control the coolant depending on a fourth cooling condition to decrease the temperature of the battery, based on that the processor identifies that the degree to which the SOH of the battery is smaller than the reference SOH of the host vehicle is greater than or equal to the predetermined difference value and that the processor identifies that the temperature of the battery is greater than the second temperature, in the state in which the host vehicle is not traveling, and wherein the third cooling condition and the fourth cooling condition include at least one of a time to cool the coolant, a number of times to cool the coolant, a temperature at which the coolant is cooled, instant cooling performance, or a time when the coolant is maintained, or any combination thereof, and wherein a number of operations per day in the third cooling condition is set to be smaller than a number of operations per day in the fourth cooling condition.

5. A vehicle control apparatus, comprising:

a memory storing a program instruction; and a processor configured to execute the program instruction, wherein the processor is configured to:

obtain reference states of health (SOHs) for each vehicle type, the reference SOHs being determined through evaluation of durability of batteries for each vehicle type;

identify which vehicle type of battery a battery of a host vehicle corresponds to;

identify a reference SOH of the host vehicle, the reference SOH corresponding to the battery of the host vehicle, among the reference SOHs for each vehicle type; and control at least one of a temperature of the battery or an output of the battery, or any combination thereof, based on that the processor identifies that an SOH of the battery of the host vehicle is smaller than the reference SOH of the host vehicle, wherein the processor is further configured to:

more decrease the output of the battery than an output of the battery when the SOH of the battery of the host vehicle is not smaller than the reference SOH of the host vehicle, depending on a first output condition, in a state in which the host vehicle is traveling, based on that the processor identifies that a degree to which the SOH of the battery is smaller than the reference SOH of the host vehicle is less than a predetermined difference value; or more decrease the output of the battery than the output of the battery when the SOH of the battery of the host vehicle is not smaller than the reference SOH of the host vehicle, depending on a second output condition, in the state in which the host vehicle is traveling, based on that the processor identifies that the degree to which the SOH of the battery is smaller than the reference SOH of the host vehicle is greater than or equal to the predetermined difference value, and wherein the output of the battery while the host vehicle is traveling according to the first output condition is set to be smaller than the output of the battery while the host vehicle is traveling according to the second output condition or a maximum output of the battery according to the first output condition is set to be smaller than a maximum output of the battery according to the second output condition.

6. The vehicle control apparatus of claim 1, wherein the reference SOH of the host vehicle is set by any one of an accumulated driving distance of the host vehicle, a duration of use of the battery, or a life cycle of the battery.

7. The vehicle control apparatus of claim 1, wherein the processor is further configured to:

monitor the SOH of the battery and compare the SOH of the battery with the reference SOH of the host vehicle.

8. The vehicle control apparatus of claim 1, wherein the processor is further configured to:

provide a user with a notification of selecting or recommending whether to control the at least one of the temperature of the battery or the output of the battery, or the any combination thereof, when the processor identifies that the SOH of the battery is smaller than the reference SOH of the host vehicle.

9. The vehicle control apparatus of claim 1, wherein the processor is further configured to:

determine the SOH of the battery, based on at least one of a charging capacity when the battery is charged, charging energy when the battery is charged, a voltage drop for each output of the battery when the host vehicle is traveling, or discharging energy of the battery, or any combination thereof.

10. The vehicle control apparatus of claim 1, wherein the processor is configured to:

end the control of the at least one of the temperature of the battery or the output of the battery, or the any combination thereof, based on that the temperature of the battery reaches a temperature at which performance of the battery does not deteriorate or when the SOH of the battery reaches the reference SOH of the host vehicle.

11. A vehicle control method, comprising:

obtaining, by a processor, reference states of health (SOHs) for each vehicle type, the reference SOHs being determined through evaluation of durability of batteries for each vehicle type;

identifying, by the processor, which vehicle type of battery a battery of a host vehicle corresponds to;

identifying, by the processor, a reference SOH of the host vehicle, the reference SOH corresponding to the battery of the host vehicle, among the reference SOHs for each vehicle type;

identifying, by the processor, that an SOH of the battery of the host vehicle is smaller than the reference SOH of the host vehicle; and controlling, by the processor, at least one of a temperature of the battery or an output of the battery, or any combination thereof, wherein the controlling of the at least one of the temperature of the battery or the output of the battery, or the any combination thereof by the processor includes:

controlling, by the processor, the at least one of the temperature of the battery or the output of the battery, or the any combination thereof, depending on any one of a first heating condition and a second heating condition including at least one of a time to heat a coolant, a number of times to heat the coolant, a temperature at which the coolant is heated, a flow rate of the coolant, or a flow velocity of the coolant, or any combination thereof, wherein the controlling of the at least one of the temperature of the battery or the output of the battery, or the any combination thereof, depending on the any one of the first heating condition and the second heating condition by the processor includes:

controlling, by the processor, the coolant depending on the first heating condition to increase the temperature of the battery, based on that the processor identifies that a degree to which the SOH of the battery is smaller than the reference SOH of the host vehicle is less than a predetermined difference value and that the processor identifies that the temperature of the battery is less than a first temperature including a low temperature at which performance of the battery deteriorates, in a state in which the host vehicle is traveling; or controlling, by the processor, the coolant depending on the second heating condition to increase the temperature of the battery, based on that the processor identifies that the degree to which the SOH of the battery is smaller than the reference SOH of the host vehicle is greater than or equal to the predetermined difference value and that the processor identifies that the temperature of the battery is less than the first temperature, in the state in which the host vehicle is traveling, wherein a number of operations per day in the first heating condition is set to be smaller than a number of operations per day in the second heating condition, and wherein the operations include an operation for heating the coolant, an operation for controlling the flow rate of the coolant, or an operation for controlling the flow velocity of the coolant or any combination thereof.

12. The vehicle control method of claim 11, wherein the controlling of the at least one of the temperature of the battery or the output of the battery, or the any combination thereof by the processor includes:

controlling, by the processor, the at least one of the temperature of the battery or the output of the battery, or the any combination thereof, depending on any one of a first cooling condition and a second cooling condition including at least one of a time to cool the coolant, a number of times to cool the coolant, a temperature at which the coolant is cooled, instant cooling performance, or a time when the coolant is maintained, or any combination thereof, and wherein the controlling of the at least one of the temperature of the battery or the output of the battery, or the any combination thereof, depending on the any one of the first cooling condition and the second cooling condition by the processor includes:

controlling, by the processor, the coolant depending on the first cooling condition to decrease the temperature of the battery, based on that the processor identifies that a degree to which the SOH of the battery is smaller than the reference SOH of the host vehicle is less than a predetermined difference value and that the processor identifies that the temperature of the battery is greater than a second temperature including a high temperature at which performance of the battery deteriorates, in a state in which the host vehicle is traveling; or controlling, by the processor, the coolant depending on the second cooling condition to decrease the temperature of the battery, based on that the processor identifies that the degree to which the SOH of the battery is smaller than the reference SOH of the host vehicle is greater than or equal to the predetermined difference value and that the processor identifies that the temperature of the battery is greater than the second temperature, in the state in which the host vehicle is traveling.

13. The vehicle control method of claim 12, wherein the controlling of the at least one of the temperature of the battery or the output of the battery, or the any combination thereof by the processor includes:

determining, by the processor, the instant cooling performance, based on at least one of a degree to which a flow rate of the coolant increases or a degree to which a flow velocity of the coolant increases, or any combination thereof.

14. The vehicle control method of claim 11, wherein the controlling of the at least one of the temperature of the battery or the output of the battery, or the any combination thereof by the processor includes:

controlling, by the processor, the at least one of the temperature of the battery or the output of the battery, or the any combination thereof, depending on any one of a third cooling condition and a fourth cooling condition including at least one of a time to cool the coolant, a number of times to cool the coolant, a temperature at which the coolant is cooled, instant cooling performance, or a time when the coolant is maintained, or any combination thereof, wherein the controlling of the at least one of the temperature of the battery or the output of the battery, or the any combination thereof, depending on the any one of the third cooling condition and the fourth cooling condition by the processor includes:

controlling, by the processor, the coolant depending on the third cooling condition to decrease the temperature of the battery, based on that the processor identifies that a degree to which the SOH of the battery is smaller than the reference SOH of the host vehicle is less than a predetermined difference value and that the processor identifies that the temperature of the battery is greater than a second temperature including a high temperature at which performance of the battery deteriorates, in a state in which the host vehicle is not traveling; or controlling, by the processor, the coolant depending on the fourth cooling condition to decrease the temperature of the battery, based on that the processor identifies that the degree to which the SOH of the battery is smaller than the reference SOH of the host vehicle is greater than or equal to the predetermined difference value and that the processor identifies that the temperature of the battery is greater than the second temperature, in the state in which the host vehicle is not traveling, and wherein a number of operations per day in the third cooling condition is set to be smaller than a number of operations per day in the fourth cooling condition.

15. The vehicle control method of claim 11, wherein the controlling of the at least one of the temperature of the battery or the output of the battery, or the any combination thereof by the processor includes:

more decreasing, by the processor, the output of the battery than an output of the battery when the SOH of the battery of the host vehicle is not smaller than the reference SOH of the host vehicle, depending on a first output condition, in a state in which the host vehicle is traveling, based on that the processor identifies that a degree to which the SOH of the battery is smaller than the reference SOH of the host vehicle is less than a predetermined difference value; or more decreasing, by the processor, the output of the battery than the output of the battery when the SOH of the battery of the host vehicle is not smaller than the reference SOH of the host vehicle, depending on a second output condition, in the state in which the host vehicle is traveling, based on that the processor identifies that the degree to which the SOH of the battery is smaller than the reference SOH of the host vehicle is greater than or equal to the predetermined difference value, and wherein the output of the battery while the host vehicle is traveling according to the first output condition is set to be smaller than the output of the battery while the host vehicle is traveling according to the second output condition or a maximum output of the battery according to the first output condition is set to be smaller than a maximum output of the battery according to the second output condition.

16. The vehicle control method of claim 11, wherein the identifying of the reference SOH of the host vehicle, the reference SOH corresponding to the battery of the host vehicle, among the reference SOHs for each vehicle type by the processor includes:

setting, by the processor, the reference SOH of the host vehicle by any one of an accumulated driving distance of the host vehicle, a duration of use of the battery, or a life cycle of the battery.

17. The vehicle control method of claim 11, wherein the identifying of that the SOH of the battery of the host vehicle is smaller than the reference SOH of the host vehicle by the processor includes:

providing, by the processor, a user with a notification of selecting whether to control the at least one of the temperature of the battery or the output of the battery, or the any combination thereof, when the processor identifies that the SOH of the battery is smaller than the reference SOH of the host vehicle; or providing, by the processor, the user with a notification of recommending the control of the at least one of the temperature of the battery or the output of the battery, or the any combination thereof, when the processor identifies that the SOH of the battery is smaller than the reference SOH of the host vehicle.

18. The vehicle control method of claim 11, wherein the identifying of that the SOH of the battery of the host vehicle is smaller than the reference SOH of the host vehicle by the processor includes:

determining, by the processor, the SOH of the battery, based on at least one of a charging capacity when the battery is charged, charging energy when the battery is charged, a voltage drop for each output of the battery when the host vehicle is traveling, or discharging energy of the battery, or any combination thereof.

* * * * *